(12) United States Patent  
Ekmedzic

(10) Patent No.: US 8,434,714 B2
(45) Date of Patent: May 7, 2013

(54) AIRCRAFT LANDING GEAR

(75) Inventor: Andrija Ekmedzic, Bristol (GB)

(73) Assignee: Airbus Operations Limited, Bristol (GB)

(*) Notice: Subject to any disclaimer, the term of this patent is extended or adjusted under 35 U.S.C. 154(b) by 286 days.

(21) Appl. No.: 12/929,566

(22) Filed: Feb. 1, 2011

(65) Prior Publication Data

US 2011/0186680 A1    Aug. 4, 2011

(30) Foreign Application Priority Data

Feb. 4, 2010   (GB) .................................. 1001826.5

(51) Int. Cl.
*B64C 25/14*   (2006.01)
(52) U.S. Cl.
USPC ............... 244/102 R; 244/102 A; 244/100 R
(58) Field of Classification Search ............ 244/100 R, 244/102 A, 103 R, 104 R, 102 R
See application file for complete search history.

(56) References Cited

U.S. PATENT DOCUMENTS

| | | | | |
|---|---|---|---|---|
| 1,914,092 | A | * | 6/1933 | Henrichsen et al. ...... 244/102 R |
| 3,670,996 | A | * | 6/1972 | Jenny ........................ 244/103 R |
| 4,408,736 | A | * | 10/1983 | Kirschbaum et al. ..... 244/100 R |
| 5,058,827 | A | * | 10/1991 | Dansereau et al. ....... 244/103 R |
| 2004/0079836 | A1 | | 4/2004 | Chambers |
| 2008/0006742 | A1 | * | 1/2008 | Guering et al. ............... 244/121 |
| 2009/0206199 | A1 | * | 8/2009 | Jackson .................... 244/103 R |
| 2011/0215196 | A1 | * | 9/2011 | Foster et al. ............. 244/100 R |

OTHER PUBLICATIONS

UK Search Report for GB No. 1001826.5, dated May 24, 2010.

* cited by examiner

*Primary Examiner* — Christopher P Ellis
*Assistant Examiner* — Medhat Badawi
(74) *Attorney, Agent, or Firm* — Nixon & Vanderhye, P.C.

(57) ABSTRACT

An aircraft landing gear for an aircraft having an engine, an outer surface, a cavity formed in the outer surface, a cover arranged to close the cavity, the landing gear being arranged to be movable between a stowed configuration, in which it is stowed in the cavity, and a deployed configuration, the landing gear comprising an engine debris guard panel arranged to inhibit tire propelled debris striking the engine whilst the landing gear is in the deployed configuration, wherein the guard panel is arranged to form at least a part of the cover when the landing gear is in the stowed configuration.

21 Claims, 3 Drawing Sheets

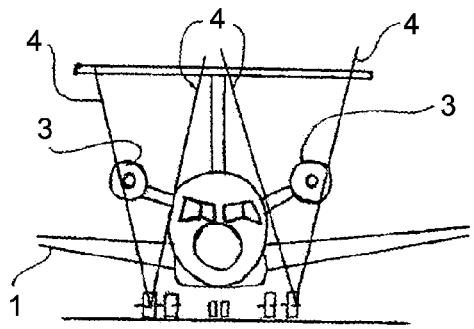
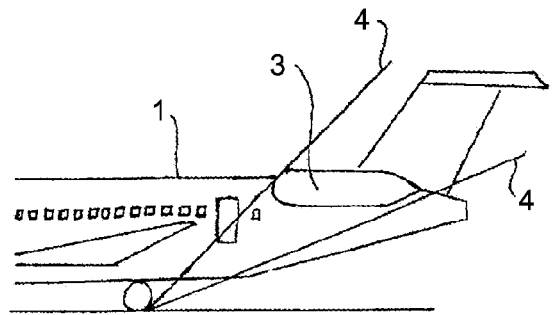
FIG. 1A   FIG. 1B
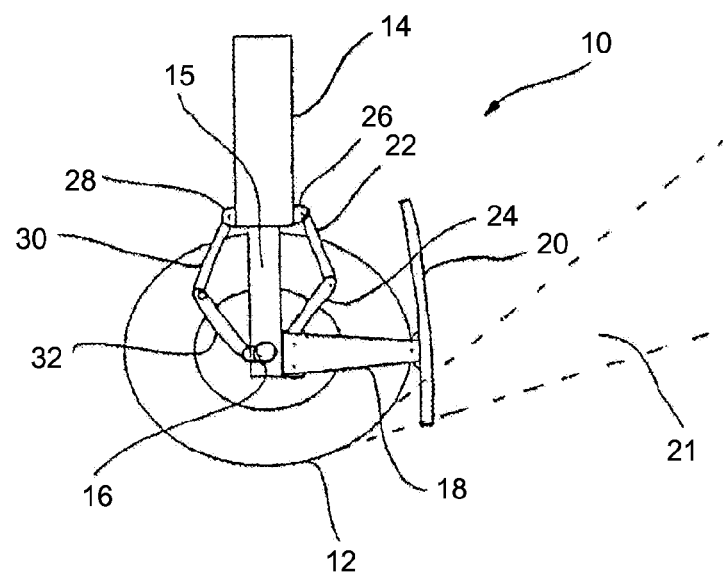
FIG. 2

AIRCRAFT LANDING GEAR

This application claims priority to GB Application No. 1001826.5, filed 4 Feb. 2010, the entire contents of which is hereby incorporated by reference.

Aircraft designers and manufacturers must take into consideration many potential risks arising from the failure of aircraft components during the design of a new aircraft. One such risk is the failure of one or more of the wheels and tyres of the main landing gear of the aircraft. A tyre failure can occur simply as a result of tyre wear of fatigue, or as a result of the tyre striking an object on the runway, particularly when the aircraft is moving at speed on ground, i.e. during either take-off of landing. A failure of the aircraft wheel itself will often result in the associated tyre failing. When a tyre fails it generates a certain amount of tyre debris as one or more portions of the tyre disintegrates. When the aircraft is travelling at speed any tyre debris will be flung from the tyre at relatively high speed with a high probability of striking the underside of the aircraft, either the underside of the fuselage or the underside of the wings. Such debris impact has the potential to cause significant damage to the aircraft structure. As a consequence, the underside of the aircraft fuselage and wings generally include areas of increased thickness and strength where tyre debris impact is a possibility to mitigate the damage caused by such an impact. However, providing areas of increased thickness and strength may not protect some parts of the aircraft which are directly exposed to the potential trajectory of the tyre debris. An example of such a high risk area is a rear mounted aircraft engine. A known solution to this problem is to provide a debris guard in the likely trajectory of debris travelling from the landing gear to the high-risk area, such that the debris guard can inhibit wheel-propelled debris from striking the high-risk area. However, such an engine debris guard must generally be of a suitable size and configuration to perform its intended function and therefore may, in some cases, increase the weight of the aircraft by an undesirable amount and/or increase the overall size of the landing gear by an undesirable amount.

According to a first aspect of the present invention there is provided an aircraft landing gear for an aircraft having an engine, an outer surface, a cavity formed in the outer surface and a cover arranged to close the cavity, the landing gear being arranged to be movable between a stowed configuration, in which it is stowed in the cavity, and a deployed configuration, the landing gear comprising an engine debris guard panel arranged to inhibit tyre propelled debris striking the engine whilst the landing gear is in the deployed configuration, wherein the guard panel is arranged to form at least a part of the cover when the landing gear is in the stowed configuration Thus, the landing gear assembly according to this aspect of the present invention includes an engine debris guard panel arranged to form part of a cover for covering the landing gear cavity. This may reduce the total weight of an aircraft by the amount of material of a conventional cover that the debris guard panel replaces. Furthermore, the landing gear of this aspect may enable a landing gear cavity to be smaller due to the cavity not being required to contain the entire landing gear including a debris guard. Rather, the guard panel forms part of the cover, rather than being located behind the cover, when closed.

The guard panel may be arranged to conform to the aerodynamic profile of the cover.

The cover may comprise the guard panel and one or more cover panels movable between a closed configuration where the cover panels contribute to closing the cavity and an open configuration where at least some of the cavity entrance is open.

Thus, the guard panel may be smaller than the size of a cover required to close the cavity. This may reduce drag due to air resistance when the landing gear is deployed during takeoff and landing. Furthermore, the overall weight of the landing gear may in some cases be reduced in comparison with a guard panel forming the entire cover, which may reduce wear on landing gear actuators arranged to deploy and retract the landing gear with respect to the aircraft, or it can reduce the size and weight of the actuators.

The guard panel may be arranged to mechanically interface with one or more of the cover panels, such that the latter, when in the closed configuration, can support the landing gear in a generally stowed configuration.

At least a portion of the guard panel may be arranged to absorb kinetic energy from tyre propelled debris striking the guard panel.

The guard panel may be mounted on a support arm. At least a portion of the support arm may be arranged to absorb kinetic energy from tyre propelled debris. For example, a portion of the support arm may comprise oleo-pneumatic shock absorbers. At least a portion of the support arm may comprise adjustable parts arranged to enable adjustment of the guard panel to align it properly to the aerodynamic profile of the aircraft when the landing gear is in the stowed configuration, thus accounting for imperfections in aircraft structure build.

At least a portion of the guard panel may be arranged to withstand the impact of tyre propelled debris such that the tyre propelled debris does not travel towards the engine.

At least a portion of the guard panel may include a blade arranged to cut tyre propelled engine debris.

The guard panel may comprise a further protection portion arranged to at least partially encompass the wheel and tyre assembly.

The engine may be an engine mounted towards the rear of the aircraft.

These and other aspects of the present invention will be apparent from and clarified with reference to the embodiments described herein.

Embodiments of the present invention will now be described, by way of example only, with reference to the accompanying drawings, in which:

FIGS. 1A and 1B illustrate front and side views of a of rear engine aircraft showing the range of debris trajectories that would result in debris striking an engine;

FIG. 2 is a partial schematic side elevation of a landing gear according to an embodiment of the present invention;

Figure 3:
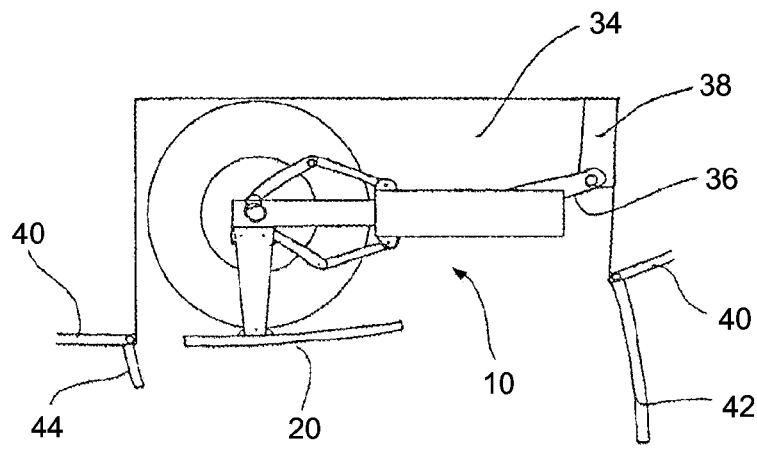
FIG. 3 is a partial schematic side elevation of an aircraft including the landing gear of FIG. 2 in a stowed configuration, with cover panels in a position midway between open and closed configurations.

FIGS. 1A and 1B show front and side views of an aircraft 1 having rear mounted engines 3. Also illustrated, bound by solid lines 4, are the range of possible trajectories for debris originating from one of the wheels of the landing gear of the aircraft 1 that would result in the debris striking one of the engines 3. It is debris with a trajectory within this range that the engine debris guard of embodiments of the present invention is intended to prevent from striking the engines 3.

FIG. 2 shows a partial schematic representation of an aircraft comprising a landing gear 10 according to an embodiment of the present invention. The landing gear 10 comprises wheel and tyre assemblies 12 (only one of which is shown for clarity), in combination with an engine debris guard panel 20. The landing gear also comprises a main fitting 14 arranged to be pivotally connected to an aircraft in a conventional manner, at an upper end thereof. A lower end of the main fitting 14 is provided with lugs 26, 28. A telescopic element 15 is slidably mounted within the main fitting 14 so as to protrude therefrom. A free end of the telescopic element 15 carries an axle 16 upon which the wheel and tyre assemblies 12 are mounted. A support arm 18 is connected at a first end to the telescopic element 15 and arranged such that the longitudinal axis of the support arm 18 is generally orthogonal with respect to the longitudinal axis of the telescopic element 15. The engine debris guard panel 20 is attached to a second end of the support arm 18. At least a portion of the support arm 18 may contain adjustable parts such as locking and/or adjustable fasteners which may be used to adjust guard panel 20 to align it properly to the aerodynamic profile of the aircraft when the landing gear 10 is in a stowed configuration, thus accounting for imperfections in aircraft structure build. An upper torque link 22 is pivotally connected, at a first end, to the lug 26 and pivotally connected at a second end to a lower torque link 24. The distal end of the lower torque link 24 to that connected to the upper torque link 22 is pivotally connected to a lug (not shown) provided at the end of the telescopic element 15 nearest the axle 16. The upper and lower torque links 22, 24 function to restrict the rotation of the telescopic element 15 of the landing gear 10 about the main fitting 14. An upper and lower slave link 30, 32 are similarly connected and function to support any electrical and hydraulic harnesses connecting equipment which may be mounted on the wheel and tyre assembly 12 and/or axle 16.

In order to provide substantially complete protection of a rear-mounted aircraft engine from any type of propelled debris, the guard panel 20 should preferably be configured of suitable size with respect to the wheel and tyre assembly 12 such that it extends fully across the "trajectory cone" 21 in which an unimpeded piece of debris originating from the wheel and tyre assembly 12 will strike the aircraft engine. In the illustrated embodiment the guard panel 20 is of similar width and height as the wheel and tyre assembly 12, as this reduces drag caused by the panel during aircraft flight (e.g. takeoff) in comparison with a larger panel.

Referring now to FIG. 3, a partial schematic representation of an aircraft is shown comprising the landing gear 10 of FIG. 2. The landing gear 10 is pivotally connected to a support structure 38 via a connection arm 36, such that it is movable between a deployed configuration, for take-off and landing, and a stowed configuration for flight. The landing gear 10 is shown in a stowed configuration in FIG. 3. The support structure 38 is located within a landing gear cavity 34, within the aircraft. When in the stowed position, the majority of the landing gear 10 resides within the cavity 34. However, the guard panel 20 is arranged to form part of a cover 20, 42, 44 arranged to close the cavity 34. The cavity 34 may therefore be smaller than known cavities because the cavity 34 need not be arranged to accommodate the entire guard panel 20 within the cavity 34, such that a cover forming the landing gear door may close the cavity when the landing gear is in the stowed position. Also, because the guard panel 20 forms part of the landing gear door/cover of the aircraft, in some embodiments the total weight of the aircraft may be reduced compared to an aircraft having a known cover and separate tyre debris guard. In the illustrated embodiment, the guard panel 20 does not form the whole part of the cover 20, 42, 44.

Figure 4:
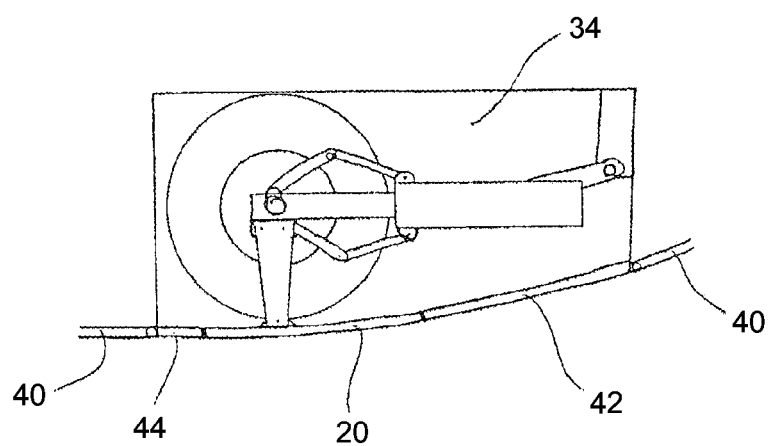
FIG. 4 is a partial schematic side elevation of an aircraft including the landing gear of FIG. 2 in a stowed configuration, with the cover panels in the closed configuration.

Rather, the guard panel 20 forms a component part of the landing gear cover 20, 42, 44 in that the landing gear cover 20, 42, 44 comprises the guard panel 20 in addition to a first cover panel 42 pivotally connected to the aircraft skin 40 at a first side of the cavity 34 and a second cover panel 44 pivotally connected to the aircraft skin 40 on an opposite side of the cavity 34. This may reduce drag due to air resistance when the landing gear is deployed during takeoff and landing. Furthermore, the overall weight of the landing gear may in some cases be reduced in comparison to a guard panel forming the entire cover, which may reduce wear on actuators arranged to deploy and retract the landing gear, or reduce actuator size and weight. The cover panels 42, 44 are movable between an open configuration and a closed configuration. FIG. 3 shows the cover panels 42, 44 midway between the open and closed configurations. FIG. 4 shows the cover panels 42, 44 in the closed configuration. When in the closed configuration, the skin 40, guard panel 20 and cover panels 42, 44 together close the cavity and the cover panels are contiguous with respect to the guard panel 20. The guard panel 20 may include a seal around its peripheral edge to form a seal between the guard panel 20 and other parts of the cover 20, 42, 44 and/or the skin 40 of the aircraft.

The guard panel 20 is preferably configured so as to conform to the aerodynamic profile of the cover 20, 42, 44 and the cover in turn is preferably configured so as to conform to the aerodynamic profile of the aircraft. Thus, in the illustrated embodiment the panels 20, 42, 44 provide a substantially seamless outer surface of the aircraft, so as to provide a suitable aerodynamic profile. However, the panels 20, 42, 44 may take any suitable configuration.

Whilst in the illustrated embodiment, the cover panels are shown to be pivotally attached to the skin, in other embodiments the cover panels 42, 44 may move between an open and closed configuration by any suitable means, such as by substantially linear movement or the like. Although in the illustrated embodiment the guard panel 20 is shown in combination with two cover panels 42, 44 to form the landing gear cover, in other embodiments, the landing gear cover 20, 42, 44 may consist purely of the guard panel 20 or of the guard panel 20 in combination with one or more cover panels.

The guard panel 20 may be formed in any suitable material and may comprise a number of different materials. It is preferred that the outer surface is formed of a smooth material, such as carbon, glass or aramid fibre composite, or the like, so as to provide an aerodynamic surface.

At least a portion of the debris guard panel 20 may, in some embodiments, be formed of a shock absorbing material of a sufficient thickness to absorb tyre propelled debris energy so as to stop or substantially slow the debris such that it cannot reach the engine. An example of such a material is rubber or aramid. Alternatively or in addition, the guard panel 20 may be configured to as to provide a shock absorbing mechanism, such as comprising a plurality parts pivotally connected, with each connection having resistive means, such as springs, opposing pivotal movement between the parts. The guard panel 20 may take any suitable configuration to provide a shock absorbing function. In some embodiments the shock absorption function may be provided by the configuration of the support arm 18, which may incorporate one or more oleo-pneumatic shock absorbers, or any other suitable shock absorbing means.

A portion of the debris guard 20 may, in some embodiments, comprise a material of sufficient rigidity to withstand the impact of tyre propelled debris and react to such an impact in a manner such that the tyre propelled debris will not reach the engine. An example of such a material is carbon composite.

In some embodiments a portion of the guard panel 20 may be provided with a blade or other suitable cutting surface arranged to cut tyre propelled debris into smaller pieces and in some cases deflect the trajectory thereof. The cutting edge of the blade may face the wheel and tyre assembly 12. A plurality of blades or the like may be arranged in a matrix or other suitable arrangement to cut tyre propelled debris travelling in a range of trajectories within the trajectory cone 21.

Figure 5:
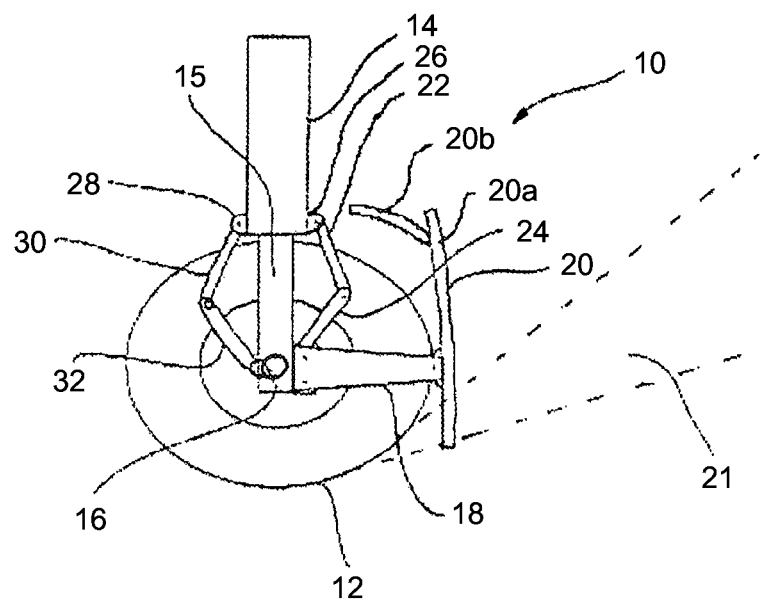
FIG. 5 is a partial schematic side elevation of an aircraft including a landing gear according to a further embodiment of the present invention.

Referring to FIG. 5, a partial schematic representation of an aircraft comprising a landing gear 10 according to a further embodiment of the present invention is shown. In the illustrated embodiment, the landing gear 10 is generally the same as the landing gear 10 of FIG. 2. However, in addition to the outer surface area arranged to conform to the skin of the aircraft, herein referred to as the "aerodynamic area" 20a, the guard panel 20 includes a further protection portion 20b which may take the form of a peripheral lip, flange, or other portion. When the landing gear 10 is in the stowed configuration, the further protection portion 20b extends into the cavity. The further protection portion 20b is be arranged such that it at least partially encompasses the edge of the wheel assembly 12 so as to provide a greater degree of protection from debris projected therefrom. The further protection portion 20b is arranged such that it does not interfere with the cover panels 42, 44 (where provided) moving to the closed configuration wherein they are contiguous with respect to the guard panel 20.

Figure 6:
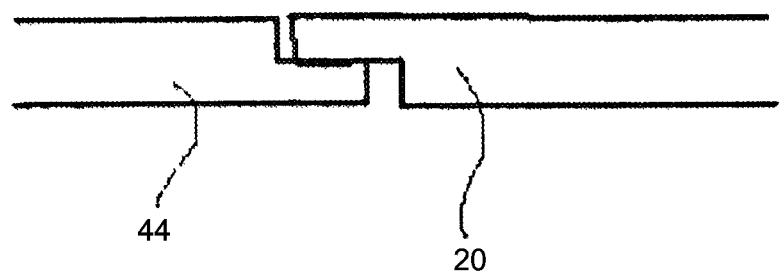
FIG. 6 is a partial schematic side elevation of a guard panel of a landing gear according to a further embodiment of the present invention, where the guard panel interfaces with a cover panel, when in the stowed configuration.

Referring to FIG. 6, a portion of the guard panel 20 may, in some embodiments, be arranged to mechanically interface with one or more adjacent cover panels 42, 44 such that the cover panels 42, 44 can hold the landing gear 10 substantially in the stowed configuration in the event that the primary means arranged to hold the landing gear 10 in the stowed configuration should fail. The interface may be provided by way of portions of overlap between the guard panel 20 and the cover panels 40, 42. In the illustrated example the guard panel 20 includes an upper lip arranged to fit above a corresponding lower lip provide on one or more guard panels. Thus, the landing gear 10 may be moved to the stowed configuration and the cover panels 42, 44 moved to the closed configuration so as to position the lower lip(s) under the upper lip(s) of the guard panel 20. Should the locking means arranged to hold the landing gear 10 in the stowed position fail, the upper lips will abut the lower lips, thereby maintaining the landing gear 10 in the stowed configuration.

It should be noted that the guard panel 20 shown in the accompanying figures is not necessarily to scale and may be arranged to provide sufficient clearance such that it does not foul the ground during take-off and landing of the associated aircraft.

The invention claimed is:

1. An aircraft landing gear for an aircraft having an engine, an outer surface, a cavity formed in the outer surface and a cover arranged to close the cavity, the landing gear being arranged to be movable between a stowed configuration, in which it is stowed in the cavity, and a deployed configuration, the landing gear comprising an engine debris guard panel arranged to inhibit tyre propelled debris striking the engine whilst the landing gear is in the deployed configuration, wherein the guard panel is arranged to form at least a part of the cover when the landing gear is in the stowed configuration, wherein the cover comprises the guard panel and first and second cover panels movable between a closed configuration where the cover panels contribute to closing the cavity and an open configuration where at least some of the cavity entrance is open, wherein the first cover panel is movably connected to the outer surface at the opposite side of the cavity to the first panel, such that the guard panel is disposed between the cover panels when the landing gear is in the stowed configuration.

2. An aircraft landing gear according to claim 1, wherein the guard panel is arranged to mechanically interface with one or more of the cover panels, such that the latter, when in the closed configuration, can support the landing gear in a generally stowed configuration.

3. An aircraft landing gear according to claim 1, wherein at least a portion of the guard panel is arranged to absorb kinetic energy from tyre propelled debris.

4. An aircraft landing gear according to claim 1, wherein the guard panel is mounted on a support arm.

5. An aircraft landing gear according to claim 4, wherein at least a portion of the support arm is arranged to absorb kinetic energy from tyre propelled debris.

6. An aircraft landing gear according to claim 4, wherein at least a portion of the support arm comprises adjustable parts arranged to enable adjustment of the guard panel to align it properly to the aerodynamic profile of the aircraft when the landing gear is in the stowed configuration, thus accounting for imperfections in aircraft structure build.

7. An aircraft landing gear for an aircraft having an engine, an outer surface, a cavity formed in the outer surface and a cover arranged to close the cavity, the landing gear being arranged to be movable between a stowed configuration, in which it is stowed in the cavity, and a deployed configuration, the landing gear comprising an engine debris guard panel arranged to inhibit tyre propelled debris striking the engine whilst the landing gear is in the deployed configuration, wherein the guard panel is arranged to form at least a part of the cover when the landing gear is in the stowed configuration, wherein the cover comprises the guard panel and one or more cover panels movable between a closed configuration where the cover panels contribute to closing the cavity and an open configuration where at least some of the cavity entrance is open and, wherein the guard panel is arranged to mechanically interface with one or more of the cover panels, such that the latter, when in the closed configuration, can support the landing gear in a generally stowed configuration.

8. An aircraft landing gear according to claim 7, wherein at least a portion of the guard panel is arranged to absorb kinetic energy from tyre propelled debris.

9. An aircraft landing gear according to claim 7, wherein the guard panel is mounted on a support arm.

10. An aircraft according to claim 9, wherein at least a portion of the support arm is arranged to absorb kinetic energy from tyre propelled debris.

11. An aircraft according to claim 9, wherein at least a portion of the support arm comprises adjustable parts arranged to enable adjustment of the guard panel to align it properly to the aerodynamic profile of the aircraft when the landing gear is in the stowed configuration, thus accounting for imperfections in aircraft structure build.

12. An aircraft landing gear for an aircraft having an engine, an outer surface, a cavity formed in the outer surface and a cover arranged to close the cavity, the landing gear being arranged to be movable between a stowed configuration, in which it is stowed in the cavity, and a deployed configuration, the landing gear comprising an engine debris guard panel arranged to inhibit tyre propelled debris striking the engine whilst the landing gear is in the deployed configuration, wherein the guard panel is arranged to form at least a part of the cover when the landing gear is in the stowed configuration, wherein the guard panel is mounted on a support arm, and wherein at least a portion of the support arm is arranged to absorb kinetic energy from tyre propelled debris.

13. An aircraft landing gear according to claim 12, wherein the cover comprises the guard panel and one or more cover panels movable between a closed configuration where the cover panels contribute to closing the cavity and an open configuration where at least some of the cavity entrance is open.

14. An aircraft according to claim 13, wherein the guard panel is arranged to mechanically interface with one or more of the cover panels, such that the latter, when in the closed configuration, can support the landing gear in a generally stowed configuration.

15. An aircraft according to claim 12, wherein at least a portion of the guard panel is arranged to absorb kinetic energy from tyre propelled debris.

16. An aircraft according to claim 12, wherein at least a portion of the support arm comprises adjustable parts arranged to enable adjustment of the guard panel to align it properly to the aerodynamic profile of the aircraft when the landing gear is in the stowed configuration, thus accounting for imperfections in aircraft structure build.

17. An aircraft landing gear according to claim 1, wherein the guard panel is arranged to conform to the outer surface of the aircraft.

18. An aircraft landing gear according to claim 1, wherein at least a portion of the guard panel is arranged to withstand the impact of tyre propelled debris such that the tyre propelled debris does not travel towards the engine.

19. An aircraft landing gear according to claim 1, wherein the guard panel comprises a portion arranged to at least partially encompass the wheel.

20. An aircraft landing gear according to claim 1, wherein the height of the guard panel is similar to the height of a wheel of the aircraft landing gear.

21. An aircraft including a landing gear according to claim 1, wherein the engine is mounted towards the rear of the aircraft.

* * * * *